United States Patent [19]

Hong

[11] Patent Number: 5,040,864

[45] Date of Patent: Aug. 20, 1991

[54] OPTICAL CROSSPOINT SWITCH MODULE

[75] Inventor: John H. Hong, Moorpark, Calif.

[73] Assignee: Rockwell International Corporation, El Segundo, Calif.

[21] Appl. No.: 612,343

[22] Filed: Nov. 13, 1990

[51] Int. Cl.[5] ............................................. G02B 6/10
[52] U.S. Cl. ....................................... 385/16; 359/15
[58] Field of Search .......................... 350/96.11–96.15

[56] References Cited

U.S. PATENT DOCUMENTS

| | | | |
|---|---|---|---|
| 4,084,130 | 4/1978 | Holton | 372/50 |
| 4,952,010 | 8/1990 | Healey et al. | 350/3.77 |

OTHER PUBLICATIONS

"A Photorefractive Integrated Optical Vector Matrix Multiplier", SPIE Proc., vol. 825, No. 19, Aug. 1987 by Psaltis.

L. Aronson and L. Hesselink, "Photorefractive Integrated-Optical Switch Arrays in LiNbO$_3$," Optics Letters, vol. 15, No. 1, pp. 30–32, Jan. 1, 1990.

Primary Examiner—Akm Ullah
Attorney, Agent, or Firm—John C. McFarren

[57] ABSTRACT

An optical crosspoint switch module is provided for a matrix of optical sources and receivers. The switch module includes a thin film waveguide atop a substrate, an array of input optical fibers aligned along one edge of the thin film waveguide, and a similar array of output fibers aligned along a second edge of the waveguide. The waveguide and/or the substrate comprise nonlinear optical material. A film containing a grating pattern to be written into the nonlinear medium as persistent but erasable holograms is placed above the waveguide. A spatial light modulator (SLM) is positioned above the patterned film and illuminated from above by either coherent or incoherent light. The SLM functions as a selective mask so that the grating pattern of the film can be written as holograms in selected areas of the nonlinear medium. The holograms written into the nonlinear medium diffract beams from the input fibers along the first edge of the waveguide to the output fibers along the second edge of the waveguide. After holograms have been written in the nonlinear medium to provide an input-to-output light beam distribution scheme, the holograms can be erased by uniform exposure of the nonlinear medium to a light source positioned below the medium. Thereafter, the light beam distribution scheme can be switched by changing the masking pattern of the SLM and writing new holograms in the nonlinear medium.

14 Claims, 1 Drawing Sheet

OPTICAL CROSSPOINT SWITCH MODULE

TECHNICAL FIELD

The present invention relates to optical communications systems and, in particular, to a modular optical switch for interconnecting a plurality of optical sources and receivers.

BACKGROUND OF THE INVENTION

Telecommunications networks using large bandwidth optical fibers and optoelectronic devices can carry much more information than their electronic counterparts. Such networks use various multiplexing schemes to pack as much information as possible into the optical signals before transmission. The performance of optical networks, however, is limited by the switching and signal processing functions, which are presently performed using electronic devices. These create system bottlenecks resulting from the detection and re-radiation of optical energy, the limited bandwidths of electronic switching and processing devices, and the incoherence between the input and output light. Therefore, it is necessary that optical switching technology be developed to exploit the large bandwidth of optical fibers and meet the telecommunications demands of the future.

In general, optical switching systems are needed to switch among the total permutations of interconnections between M sources and M receivers. One approach to optical switching uses cylindrical lenses in conjunction with a spatial light modulator to fan out the optical input so that the light from each fiber of an input array is broadcast over the output array. A major shortcoming of such a system is that the energy efficiency for an array of N sources and N receivers is no better than 1/N because of the fan out of the input signals. Furthermore, if the output fibers are single mode fibers, as in long-haul telecommunications, there is an additional fan-in loss factor of 1/N resulting from mode mismatch in coupling the light signals into the single mode fibers. Thus, the theoretical efficiency becomes $1/N^2$, which is extremely inefficient for large N. Optical switching can also be accomplished with $LiNbO_3$ integrated optical switches. Integrated optical switches, however, tend to have variable performance from channel to channel and are unacceptably large physically for arrays greater than 4×4. An additional drawback of prior optical switching devices is that each connection is realized through a unique channel that cannot be shared. As a consequence, such devices have no tolerance for defective switches in any channel. Thus, there is a need for a compact and efficient optical switch module suitable for interconnecting and switching among at least an 8×8 array of optical sources and receivers.

SUMMARY OF THE INVENTION

The present invention comprises an M×M optical crosspoint switch module. The switch module includes a thin film planar waveguide disposed atop a substrate. The waveguide and/or the substrate comprise a nonlinear optical medium. A one-dimensional array of M optical fibers is aligned along one edge of the waveguide to input M optical signal beams. A similar array of M output optical fibers is aligned along a second edge of the waveguide to carry M optical output beams. A film containing a grating pattern to be written in the nonlinear medium as grating holograms is placed above the waveguide. A spatial light modulator (SLM) is positioned above the patterned film and illuminated from above by either coherent or incoherent light. The spatial light modulator functions as a selective mask so that the grating pattern of the film can be written as an array of grating holograms positioned in selected areas of the nonlinear medium. After the holograms are written in the nonlinear medium, they diffract the input beams entering the waveguide into selected output fibers along the second edge of the waveguide. The grating pattern of the film may be designed, for example, so that the holograms in the switching areas of the nonlinear medium provide focusing of the output light beams, thereby reducing channel-to-channel crosstalk.

The grating holograms written in the nonlinear medium provide a specific input-to-output light beam distribution scheme. When a new distribution scheme is desired, the existing holograms can be erased by uniform exposure of the nonlinear medium to a light source positioned below the medium, for example. Thereafter, the masking pattern of the SLM can be changed and new grating holograms written in the nonlinear medium to provide the new light beam distribution scheme.

In one embodiment of the present invention, the substrate rather than the waveguide comprises the nonlinear optical medium. Because a waveguide of photorefractive material, for example, deposited atop the substrate is a thin film that is likely to have its photorefractive axis aligned less than optimally, it is difficult to write effective holograms in the thin waveguide. However, a substrate fabricated of photorefractive material may be substantially thicker than the waveguide and may be oriented with its photorefractive axis optimally aligned. In this configuration, the holograms are written in the substrate, but the evanescent trails of the light passing through the waveguide cause the light beams in the waveguide to be diffracted effectively by the holograms in the substrate.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
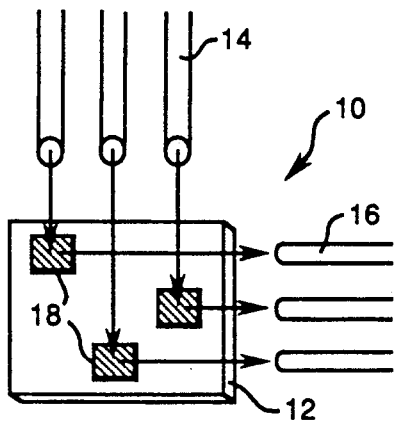
FIG. 1 is a simplified schematic diagram of a thin film optical waveguide switch.

FIG. 1 is a simplified schematic diagram illustrating the concept of a nonlinear optical switch 10 comprising a planar, thin film, nonlinear waveguide 12 that interconnects a plurality of input optical fibers 14 with a plurality of output optical fibers 16. Light beams (illustrated by arrows) from input fibers 14 are collimated in waveguide 12 and diffracted to the output fibers 16 by grating holograms 18 written in the nonlinear medium of waveguide 12. As is known in the art, holograms may be written in a nonlinear optical medium by the interaction of pairs of visible writing beams (not shown) directed into the nonlinear medium from above. In the present invention, grating holograms 18 are written into selected areas of waveguide 12 as illustrated to effect a particular interconnection scheme between the input and output optical fibers. The diffraction angle of the light beams is not limited to an orthogonal pattern as shown, but is determined by the characteristics of the nonlinear medium and the line spacing of the grating holograms 18. With proper selection of the nonlinear medium of waveguide 12, the optical fiber input light, at the preferred wavelengths of 1.3 or 1.5 μm, is diffracted by the holograms but does not otherwise effect the gratings written in the nonlinear medium by visible light. Volume holograms written in BaTiO$_3$ photorefractive crystals, for example, have demonstrated net diffraction efficiencies of up to 40% when written with visible light beams at a wavelength of 514.5 nm and read out at a wavelength of 633 nm. However, the low scattering and absorption losses in most photorefractive crystals at 1.3 or 1.5 μm should yield net diffraction efficiencies near unit.

Figure 2:
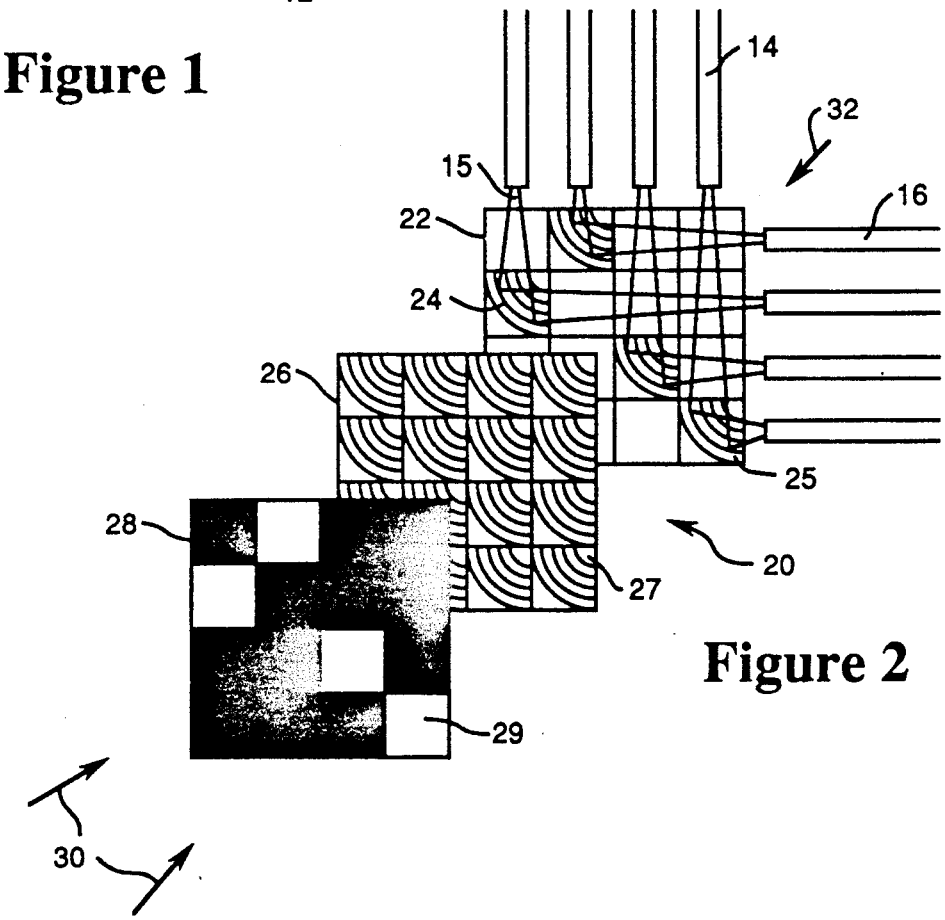
FIG. 2 is a schematic diagram of an optical crosspoint switch module of the present invention having a diffraction hologram written in a planar waveguide comprising a nonlinear optical medium.

An optical crosspoint switch module 20 of the present invention is illustrated schematically in FIG. 2 as an exploded view. As described above, the plurality of input optical fibers 14 are positioned to input a corresponding plurality of light beams 15 into a planar waveguide 22. Waveguide 22 generally comprises a thin film of nonlinear optical material disposed atop a substrate, not shown in FIG. 2. The nonlinear optical material used in the present invention may comprise photorefractive crystals, such as BaTiO$_3$, LiNbO$_3$, and SBN, for example, or various organic nonlinear optical materials. To function in the present invention, the nonlinear optical material must be the type in which persistent but erasable grating holograms can be written. In operation, light beams 15 are diffracted by grating holograms 24 written in the nonlinear medium of waveguide 22 and are received by the plurality of output optical fibers 16.

Switch module 20 utilizes a patterned film 26 positioned above waveguide 22 to write grating holograms 24 in waveguide 22. As illustrated in FIG. 2, film 26 may have a plurality of patterned sections 27, each section 27 having a grating pattern designed for a corresponding section of waveguide 22. The grating patterns of sections 27 may comprise straight gratings as illustrated by the grating holograms 18 in FIG. 1. However, the grating pattern of each section of the film may be designed specifically for each corresponding section of waveguide 22 and oriented for wavelength multiplexing, such as handling 1.3 and 1.5 μm wavelengths simultaneously, or special effects, such as diffracting and focusing light beams 15 into output fibers 16, as illustrated in FIG. 2. Focusing the individual light beams 15 has the effect of reducing channel-to-channel crosstalk in waveguide 22.

A spatial light modulator (SLM) 28 is positioned above patterned film 26 to facilitate the writing of grating holograms 24 in the selected sections of waveguide 22. SLM 28 may comprise a liquid crystal display (LCD) panel, for example. The function of SLM 28 is to render selected sections, such as section 29, transparent to light and the remaining sections opaque. SLM 28 includes associated electrical circuitry (not shown) as is well known in the art for switching selected sections of SLM 28 between the transparent and opaque modes.

Switch module 20 is operated by first establishing transparent sections in SLM 28 corresponding to sections of waveguide 22 where grating holograms 24 are necessary to effect the desired interconnection of optical inputs to outputs. A source of coherent or incoherent light, represented by arrows 30, is directed from above module 20 to write the grating holograms in waveguide 22. Light 30 passes through transparent sections of SLM 28, such as section 29, through corresponding sections of patterned film 26, such as section 27, and into waveguide 22 to write the grating patterns of film 26 in the desired sections of waveguide 22, such as the grating hologram in section 25. After grating holograms 24 are written in waveguide 22 to establish a particular interconnection scheme between optical inputs and outputs, writing light 30 is turned off. With writing light 30 off, grating holograms 24 require no further energy to maintain the interconnection scheme because the holograms decay very slowly as dictated by the thermal relaxation characteristics of the nonlinear medium.

An unmodulated light source, represented by arrow 32, may be positioned below waveguide 22 (i.e., the side of waveguide 22 opposite patterned film 26) to provide a mechanism for erasing the grating holograms in waveguide 22. When light 32 is turned on to provide uniform exposure of waveguide 22, any existing holograms are effectively erased from the nonlinear medium of waveguide 22. With the holograms erased, light 32 is turned off, a new arrangement of transparent sections is provided to SLM 28, light 30 is turned on, and new grating holograms 24 are written in waveguide 22 to switch to a new interconnection scheme for the optical inputs and outputs. The switching time for module 20 is limited by the hologram erasure and rewrite times, which are inversely proportional to the erasing and writing optical intensities. In commercially available BaTiO$_3$, for example, an optical power density of 1W/cm$^2$ would provide a switching time of about 1 second. This time can be improved in ferroelectric crystals such as SBN, for example, by increasing dopant concentrations while maintaining low absorption at the 1.3–1.5 μm wavelengths.

The minimum size of grating holograms 18 and 24 can be estimated by assuming an index perturbation amplitude, Δn, of $2 \times 10^{-4}$, which is typical for ferroelectric photorefractive material such as BaTiO$_3$ and SBN. If λ/n is the wavelength of light in the photorefractive medium and θ is the input Bragg angle, the dimension that corresponds to unity diffraction is $$\frac{\lambda \cos\theta}{2n\Delta n} \approx 1 \text{ mm},$$

where the following parameters are assumed: λ=1.3 μm; n=2.3; and θ=45°. Therefore, the size of each grating hologram must be on the order of 2 mm × 2 mm. Under these constraints, an 8×8 crosspoint switch module 20 must be at least 1.6 cm × 1.6 cm. This size is very favorable when compared with prior optical couplers. Furthermore, greater switching capability can be achieved by interconnecting an array of 8×8 switch modules with short optical fibers to form a multistage switching network.

Although the embodiment of switch module 20 shown in FIG. 2 clearly illustrates the concept of the present invention, the use of nonlinear waveguide 22 may prove to be impractical, at least with photorefractive crystals comprising the nonlinear medium. In switch module 20, where only waveguide 22 comprises nonlinear material, most of the energy of writing beam 30 is wasted because the thin film comprising waveguide 22, which typically is less than 1 μm thick, is able to absorb very little of the energy of beam 30. Furthermore, it is difficult to grow a single crystal of thin film photorefractive material on a substrate, and it may be impossible to grow such a crystal with its photorefractive axis optimally aligned for writing grating holograms.

Figure 3:
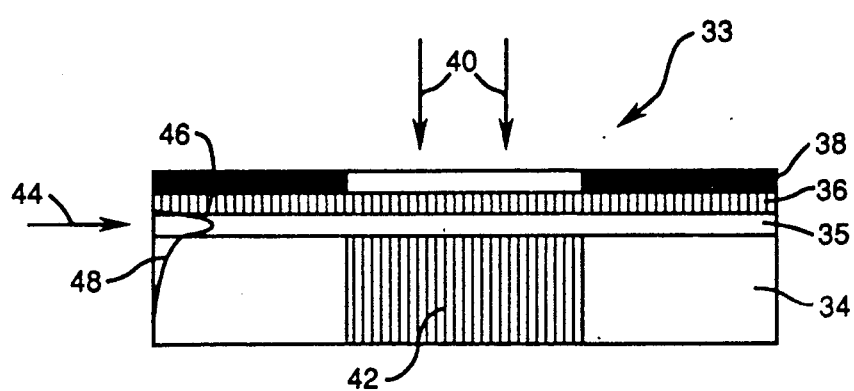
FIG. 3 is edge view of an embodiment of the optical switch module of the present invention having a diffraction hologram written in a substrate comprising a nonlinear optical medium.

FIG. 3 illustrates an edge view of a switch module 33 of the present invention having a substrate 34 comprising nonlinear optical material. As shown in FIG. 3, a waveguide 35 is disposed atop substrate 34, a patterned film 36 is disposed atop waveguide 35, and an SLM 38 is disposed atop patterned film 36. In switch module 33, waveguide 35 may comprise a non-crystalline crystalline thin film, such as a PLZT ceramic, for example, to optimize the light transmissive characteristics of waveguide 35. Substrate 34, which can be substantially thicker than waveguide 35, may comprise a photorefractive crystal having its photorefractive axis aligned to optimize the writing of grating holograms in substrate 34. As shown in FIG. 3, a writing beam of light, represented by arrows 40, passes through transparent sections of SLM 38 to write the grating pattern of film 36 as hologram 42 in the nonlinear medium of substrate 34. Hologram 42 may be erased and rewritten as described above in conjunction with switch module 20.

In operation of switch module 33, a beam of light 44 to be switched by module 33 is input to waveguide 35. The energy distribution of light beam 44 in waveguide 35 is represented by a curve 46 overlaid on waveguide 35 and substrate 34. As illustrated by curve 46, much of the energy of beam 44 is confined within waveguide 34. However, an evanescent tail 48 of beam 44 extends into substrate 34 as beam 44 advances along waveguide 35. The interaction of evanescent tail 48 with hologram 42 in substrate 34 causes the entire beam 44 to be diffracted by hologram 42 as if the hologram were written in waveguide 35. This effect enables design flexibility in optimizing the light transmissive characteristics of waveguide 35 and the nonlinear characteristics of substrate 34 to provide a fast, efficient, and compact optical switch module.

Although the present invention has been described with respect to a specific embodiment thereof, various changes and modifications may be suggested to one skilled in the art. Therefore, it is intended that the present invention encompass such changes and modifications as fall within the scope of the appended claims.

I claim:

1. An optical switch module, comprising:
a substrate;
a planar waveguide comprising a nonlinear optical medium disposed atop said substrate;
a patterned film disposed atop said waveguide, the film having a grating pattern;
means for simultaneously exposing selected sections of said patterned film to light for writing said grating pattern as a plurality of holograms in sections of said nonlinear medium corresponding to said selected sections of said patterned film;
a plurality of input optical fibers connected to said waveguide to input a plurality of light beams, each of said plurality of light beams diffracted by a corresponding one of said plurality of holograms; and
a plurality of output optical fibers connected to said waveguide, each of said output optical fibers receiving a corresponding one of said plurality of light beams diffracted by said holograms.

2. The optical switch module of claim 1, wherein said patterned film comprises a plurality of sections, each of said film sections having a grating pattern designed for writing a specific hologram in each of said corresponding sections of said nonlinear medium.

3. The optical switch module of claim 2, wherein said exposing means includes a spatial light modulator disposed atop said patterned film.

4. The optical switch module of claim 3, wherein said spatial light modulator selectively provides transparent sections corresponding to said sections of said nonlinear medium where said holograms are written.

5. The optical switch module of claim 4, wherein said spatial light modulator comprises a liquid crystal display panel having a plurality of panel sections, each of said panel sections switchable between transparent and opaque modes.

6. The optical switch module of claim 1, wherein said holograms are persistent but erasable, and said switch module is exposable to light from below said substrate for erasing said holograms written in said nonlinear medium.

7. An optical switch module, comprising:
a substrate comprising nonlinear optical material;
a planar waveguide disposed atop said substrate;
a patterned film disposed atop said waveguide, said film having a grating pattern;
means for simultaneously exposing selected sections of said patterned film to light for writing said grating pattern as a plurality of holograms in sections of said substrate corresponding to said selected sections of said patterned film;
a plurality of input optical fibers connected to said waveguide to input a plurality of light beams, each of said light beams diffracted by a corresponding one of said holograms; and
a plurality of output optical fibers connected to said waveguide, each of said output optical fibers receiving a corresponding one of said plurality of light beams diffracted by said holograms.

8. The optical switch module of claim 7, wherein said plurality of holograms are persistent but erasable, said switch module exposable to light for illuminating said substrate and erasing said holograms written in said nonlinear medium.

9. The optical switch module of claim 7, wherein said exposing means includes a spatial light modulator disposed atop said film, said spatial light modulator having a plurality of sections switchable between transparent and opaque.

10. The optical switch module of claim 9, wherein said waveguide comprises a nonlinear optical medium and said plurality of holograms are written into said waveguide and said substrate.

11. The optical switch module of claim 9, wherein said patterned film comprises a plurality of sections corresponding to said switchable sections of said spatial light modulator, each of said film sections having a grating pattern designed for writing a specific hologram in each of said corresponding sections of said nonlinear medium.

12. The optical switch module of claim 11, wherein each of said specific hologram diffracts and focuses a corresponding one of said input light beams into a corresponding one of said output optical fibers.

13. A method of interconnecting and switching among a plurality of optical fibers, comprising the steps of:
- connecting a plurality of input optical fibers to a first edge of a planar waveguide, said waveguide including a nonlinear optical medium;
- connecting a corresponding plurality of output optical fibers to a second edge of said planar waveguide;
- providing a film containing a grating pattern atop said waveguide;
- providing a spatial light modulator atop said film, said spatial light modulator having a plurality of sections switchable between transparent and opaque modes;
- switching selected ones of said spatial light modulator sections to said transparent mode;
- illuminating said spatial light modulator to write said grating pattern simultaneously as a plurality of persistent but erasable holograms in sections of said nonlinear medium corresponding to said transparent sections of said spatial light modulator; and
- diffracting light beams from said input fibers to said output fibers in an interconnection scheme determined by said plurality of holograms.

14. The method of claim 13, further comprising the steps of:
- illuminating said nonlinear medium so as to erase said plurality of holograms;
- switching newly selected ones of said spatial light modulator sections to said transparent mode;
- illuminating said spatial light modulator to write said grating pattern as a new plurality of holograms in new sections of said nonlinear medium corresponding to said newly transparent sections of said spatial light modulator; and
- diffracting light beams from said input fibers to said output fibers in a new interconnection scheme determined by said new plurality of holograms.

* * * * *